(12) United States Patent
Ma et al.

(10) Patent No.: US 10,996,072 B2
(45) Date of Patent: May 4, 2021

(54) SYSTEMS AND METHODS FOR UPDATING A HIGH-DEFINITION MAP

(71) Applicant: BEIJING DIDI INFINITY TECHNOLOGY AND DEVELOPMENT CO., LTD., Beijing (CN)

(72) Inventors: Teng Ma, Beijing (CN); Xiaoling Zhu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 16/942,737

(22) Filed: Jul. 29, 2020

(65) Prior Publication Data

US 2020/0355513 A1   Nov. 12, 2020

Related U.S. Application Data

(63) Continuation of application No. PCT/CN2018/118059, filed on Jan. 3, 2019.

(51) Int. Cl.
*G01C 21/36* (2006.01)
*G06T 7/70* (2017.01)
(Continued)

(52) U.S. Cl.
CPC ............ *G01C 21/367* (2013.01); *G01S 17/89* (2013.01); *G06T 7/0002* (2013.01); *G06T 7/70* (2017.01);
(Continued)

(58) Field of Classification Search
USPC ........................................................ 701/400
See application file for complete search history.

(56) References Cited

U.S. PATENT DOCUMENTS

| 2016/0282127 A1 | 9/2016 | Goto et al. | |
| 2016/0325753 A1* | 11/2016 | Stein | ........................ G06K 9/46 |

(Continued)

FOREIGN PATENT DOCUMENTS

| CN | 106485744 A | 3/2017 |
| CN | 106767827 A | 5/2017 |

(Continued)

OTHER PUBLICATIONS

International Search Report in PCT/CN2018/118059 dated Aug. 30, 2019, 5 pages.

(Continued)

*Primary Examiner* — Tyler D Paige
(74) *Attorney, Agent, or Firm* — Bayes PLLC

(57) ABSTRACT

Embodiments of the disclosure provide methods and systems for updating a HD map using a plurality of point cloud data frames. The method may include receiving, by a communication interface, a first data frame of a target region acquired by at least one sensor. The method may further include constructing, by at least one processor, a local HD map based on the first data frame. The method may also include receiving, by the communication interface, a second data frame of the target region acquired by the at least one sensor. The method may also include updating, by the at least one processor, the local HD map using the second data frame based on relative location and pose information associated with the second data frame relative to the local HD map, and updating, by the at least one processor the HD map based on the updated local HD map.

20 Claims, 5 Drawing Sheets

(51) Int. Cl.
*G01S 17/89* (2020.01)
*G06T 7/00* (2017.01)
*G01S 7/00* (2006.01)
*G06T 19/20* (2011.01)

(52) U.S. Cl.
CPC .... *G06T 19/20* (2013.01); *G06T 2207/10028* (2013.01); *G06T 2207/30244* (2013.01)

(56) References Cited

U.S. PATENT DOCUMENTS

| | | |
|---|---|---|
| 2017/0136626 A1 | 5/2017 | Wang et al. |
| 2017/0305546 A1 | 10/2017 | Ni et al. |
| 2018/0136651 A1* | 5/2018 | Levinson ............. G05D 1/0027 |
| 2018/0188026 A1* | 7/2018 | Zhang ..................... G06T 7/70 |
| 2018/0188037 A1 | 7/2018 | Wheeler et al. |

FOREIGN PATENT DOCUMENTS

| | | |
|---|---|---|
| CN | 107657640 A | 2/2018 |
| CN | 108387241 A | 8/2018 |
| CN | 108732584 A | 11/2018 |
| CN | 109064506 A | 12/2018 |
| WO | 2018104563 A2 | 8/2018 |

OTHER PUBLICATIONS

Written Opinion in PCT/CN2018/118059 dated Aug. 30, 2019, 4 pages.
Tan, Xiaohua, Research on Three-dimensional Planar Surfaces Map Building for Robots, China Excellent Master's Thesis Full-text Database Information Technology, 2016, 73 pages.
Chen, Jia et al, 3D Shape Modeling Using a Self-developed Handheld 3D Laser Scanner and an Efficient HT-ICP Point Cloud Registration Algorithm, Optics and Laser Technology, 45: 414-423, 2013.

\* cited by examiner

410

420

SYSTEMS AND METHODS FOR UPDATING A HIGH-DEFINITION MAP

CROSS-REFERENCE TO RELATED APPLICATIONS

This application is a Continuation of International Application No. PCT/CN2018/118059, filed on Jan. 3, 2019, the entire contents of which are hereby incorporated by reference.

TECHNICAL FIELD

The present disclosure relates to systems and methods for updating high-definition (HD) maps, and more particularly to, the systems and methods for updating HD maps based on accumulating point cloud frames.

BACKGROUND

Autonomous driving technology relies heavily on an accurate map. For example, accuracy of a navigation map is critical to functions of autonomous driving vehicles, such as positioning, ambience recognition, decision making and control. HD maps may be obtained by aggregating data acquired by various sensors, detectors, and other devices equipped on vehicles as they drive around. For example, a vehicle may be equipped with multiple sensors such as a LiDAR, a Global Positioning System (GPS) receiver, one or more Inertial Measurement Unit (IMU) sensors, and one or more cameras, to capture features of the road on which the vehicle is driving or the surrounding objects. Data captured may include, for example, center line or border line coordinates of a lane, coordinates and images of an object, such as a building, another vehicle, a landmark, a pedestrian, or a traffic sign.

HD maps are typically constructed using, e.g., a Simultaneous Localization and Mapping (SLAM) method. SLAM method includes two stages, a front-end and a back-end. The front-end constructs a series of local HD maps based on poses estimated based on the relative positions between different point cloud frames. As within a relatively short period of time, the accumulation of error in the estimated poses may be negligible, consistency within a local HD map can be maintained. The back-end integrates the local HD maps to construct the global map. The accumulated error among local HD maps becomes significant and intolerable. Thus, the back-end needs to optimize the poses based on the local HD maps provided by the front-end in order to construct the HD maps. The optimization may reduce and/or eliminate the accumulation of positioning errors.

Existing front-end local HD map construction methods typically divide the HD maps based on acquisition time or locations of the vehicle when the acquisitions are made. Those methods do not take into account the number of features needed when the local HD maps are matched in the back-end to construct the global HD map. In addition, the existing methods also fail to effectively reduce the accumulation of positioning errors. The accumulated errors within the local HD maps will affect the optimization results in the back-end.

Embodiments of the disclosure address the above problems by methods and systems for updating a HD map based on accumulating point cloud frames.

SUMMARY

Embodiments of the disclosure further disclose a method for updating a HD map. The method may include receiving, by a communication interface, a first data frame of a target region acquired by at least one sensor. The method may further include constructing, by at least one processor, a local HD map based on the first data frame. The method may also include receiving, by the communication interface, a second data frame of the target region acquired by the at least one sensor. The method may also include updating, by the at least one processor, the local HD map using the second data frame based on relative location and pose information associated with the second data frame relative to the local HD map, and updating the HD map based on the updated local HD map.

Embodiments of the disclosure provide a system for updating a HD map. The system may include a communication interface configured to receive a first data frame of a target region and a second data frame of the target region acquired by at least one sensor via network. The system may further include a storage configured to store the HD map. The system may also include at least one processor. The at least one processor may be configured to construct a local HD map based on the first data frame of a target region acquired by the at least one sensor. The at least one processor may be further configured to update the local HD map using the second data frame of the target region based on relative location and pose information associated with the second data frame relative to the local HD map. The at least one processor may also be configured to update the HD map based on the updated local map.

Embodiments of the disclosure further disclose a non-transitory computer-readable medium having a computer program stored thereon. The computer program, when executed by at least one processor, may perform a method for updating a HD map using a plurality of terminals. The method may include receiving a first data frame of a target region acquired by at least one sensor. The method may further include constructing a local HD map based on the first data frame. The method may also include receiving a second data frame of the target region acquired by the at least one sensor. The method may also include updating the local HD map using the second data frame based on relative location and pose information associated with the second data frame relative to the local HD map, and updating the HD map based on the updated local HD map.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
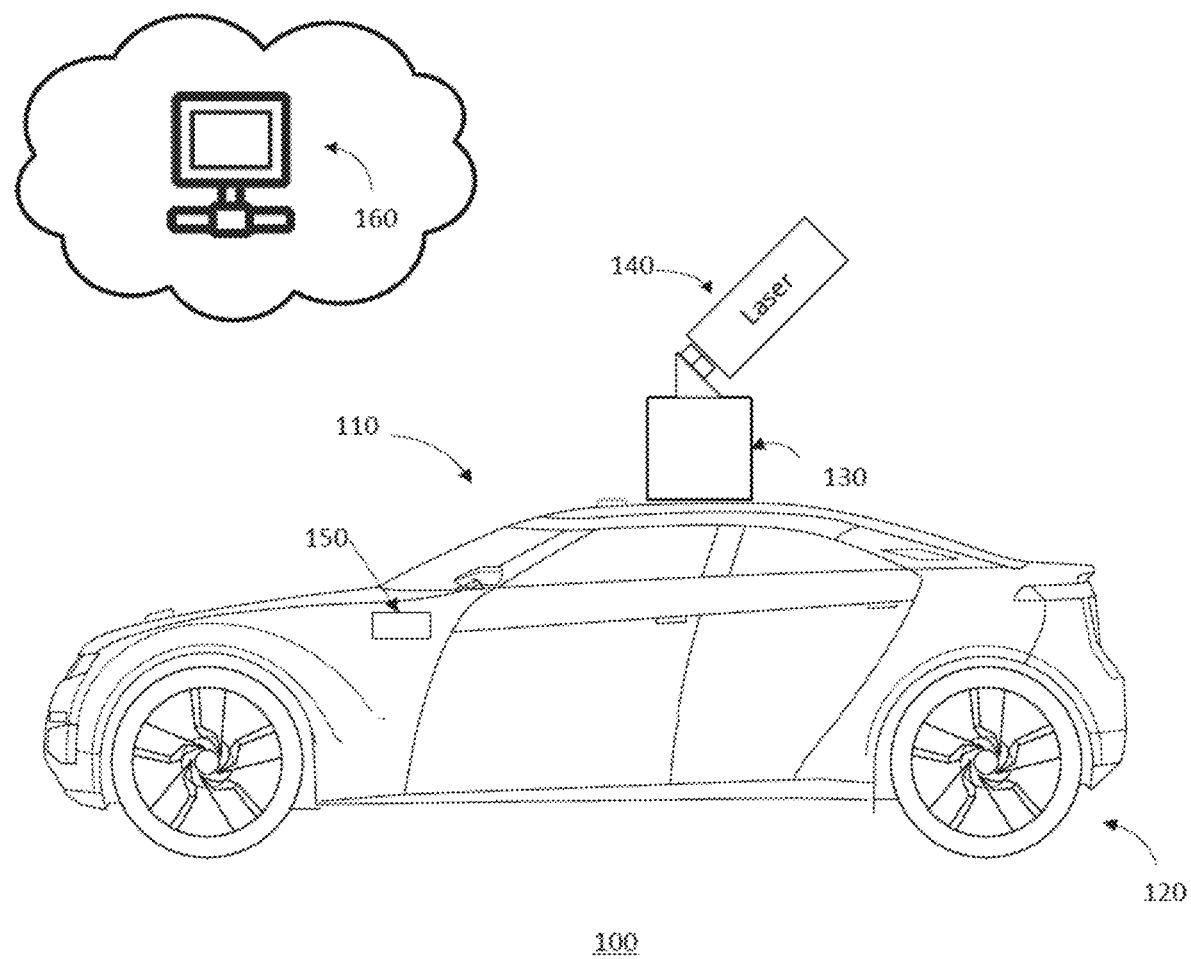
FIG. 1 illustrates a schematic diagram of an exemplary vehicle equipped with sensors, according to embodiments of the disclosure.

FIG. 1 illustrates a schematic diagram of an exemplary vehicle 100 having a plurality of sensors 140 and 150, according to embodiments of the disclosure. Consistent with some embodiments, vehicle 100 may be a survey vehicle configured for acquiring data for constructing a HD map or three-dimensional (3-D) city modeling. It is contemplated that vehicle 100 may be an electric vehicle, a fuel cell vehicle, a hybrid vehicle, or a conventional internal combustion engine vehicle. Vehicle 100 may have a body 110 and at least one wheel 120. Body 110 may be any body style, such as a sports vehicle, a coupe, a sedan, a pick-up truck, a station wagon, a sports utility vehicle (SUV), a minivan, or a conversion van. In some embodiments, vehicle 100 may include a pair of front wheels and a pair of rear wheels, as illustrated in FIG. 1. However, it is contemplated that vehicle 100 may have more or less wheels or equivalent structures that enable vehicle 100 to move around. Vehicle 100 may be configured to be all wheel drive (AWD), front wheel drive (FWR), or rear wheel drive (RWD). In some embodiments, vehicle 100 may be configured to be operated by an operator occupying the vehicle, remotely controlled, and/or autonomous.

As illustrated in FIG. 1, vehicle 100 may be equipped with sensor 140 mounted to body 110 via a mounting structure 130. Mounting structure 130 may be an electro-mechanical device installed or otherwise attached to body 110 of vehicle 100. In some embodiments, mounting structure 130 may use screws, adhesives, or another mounting mechanism. Vehicle 100 may be additionally equipped with sensor 150 inside or outside body 110 using any suitable mounting mechanisms. It is contemplated that the manners in which sensor 140 or 150 can be equipped on vehicle 100 are not limited by the example shown in FIG. 1 and may be modified depending on the types of sensors of 140/150 and/or vehicle 100 to achieve desirable sensing performance.

In some embodiments, sensors 140 and 150 may be configured to capture data as vehicle 100 travels along a trajectory. For example, sensor 140 may be a LiDAR scanner configured to scan the surrounding and acquire point clouds. LiDAR measures distance to a target by illuminating the target with pulsed laser light and measuring the reflected pulses with a sensor. Differences in laser return times and wavelengths can then be used to make digital 3-D representations of the target. The light used for LiDAR scan may be ultraviolet, visible, or near infrared. Because a narrow laser beam can map physical features with very high resolution, a LiDAR scanner is particularly suitable for HD map surveys. In some embodiments, a LiDAR scanner may capture point cloud. As vehicle 100 travels along the trajectory, sensor 140 may continuously capture data. Each set of scene data captured at a certain time range is known as a data frame.

As illustrated in FIG. 1, vehicle 100 may be additionally equipped with sensor 150, which may include sensors used in a navigation unit, such as a GPS receiver and one or more IMU sensors. A GPS is a global navigation satellite system that provides geolocation and time information to a GPS receiver. An IMU is an electronic device that measures and provides a vehicle's specific force, angular rate, and sometimes the magnetic field surrounding the vehicle, using various inertial sensors, such as accelerometers and gyroscopes, sometimes also magnetometers. By combining the GPS receiver and the IMU sensor, sensor 150 can provide real-time pose information of vehicle 100 as it travels, including the positions and orientations (e.g., Euler angles) of vehicle 100 at each time point.

In some embodiments, the point cloud data acquired by the LiDAR unit of sensor 140 may be initially in a local coordinate system of the LiDAR unit and may need to be transformed into a global coordinate system (e.g. the longitude/latitude coordinates) for later processing. Vehicle 100's real-time pose information collected by sensor 150 of the navigation unit may be used for transforming the point cloud data from the local coordinate system into the global coordinate system by point cloud data registration, for example, based on vehicle 100's poses at the time each point cloud data frame was acquired. In order to register the point cloud data with the matching real-time pose information, sensors 140 and 150 may be integrated as an integrated sensing system such that the cloud point data can be aligned by registration with the pose information when they are collected. The integrated sensing system may be calibrated with respect to a calibration target to reduce the integration errors, including but not limited to, mounting angle error and mounting vector error of sensors 140 and 150.

Consistent with the present disclosure, sensors 140 and 150 may communicate with server 160. In some embodiments, server 160 may be a local physical server, a cloud server (as illustrated in FIG. 1), a virtual server, a distributed server, or any other suitable computing device. Consistent with the present disclosure, server 160 may store a HD map. In some embodiments, the HD map may be originally constructed using point cloud data acquired by a LiDAR. LiDAR measures distance to a target by illuminating the target with pulsed laser light and measuring the reflected pulses with a sensor. Differences in laser return times and wavelengths can then be used to construct digital 3-D representations of the target. The light used for LiDAR scan may be ultraviolet, visible, or near infrared. Because a narrow laser beam can map physical features with very high resolution, LiDAR is particularly suitable for HD map surveys.

Consistent with the present disclosure, server 160 may be also responsible for updating the HD map based on accumulating local HD maps. Server 160 may receive sensor data, process sensor data, construct local HD maps based on the received sensor data, and/or update HD map based on the update local HD maps. Server 160 may communicate with sensors 140, 150, and/or other components of vehicle 100 via a network, such as a Wireless Local Area Network (WLAN), a Wide Area Network (WAN), wireless networks such as radio waves, a cellular network, a satellite communication network, and/or a local or short-range wireless network (e.g., Bluetooth™).

Figure 2:
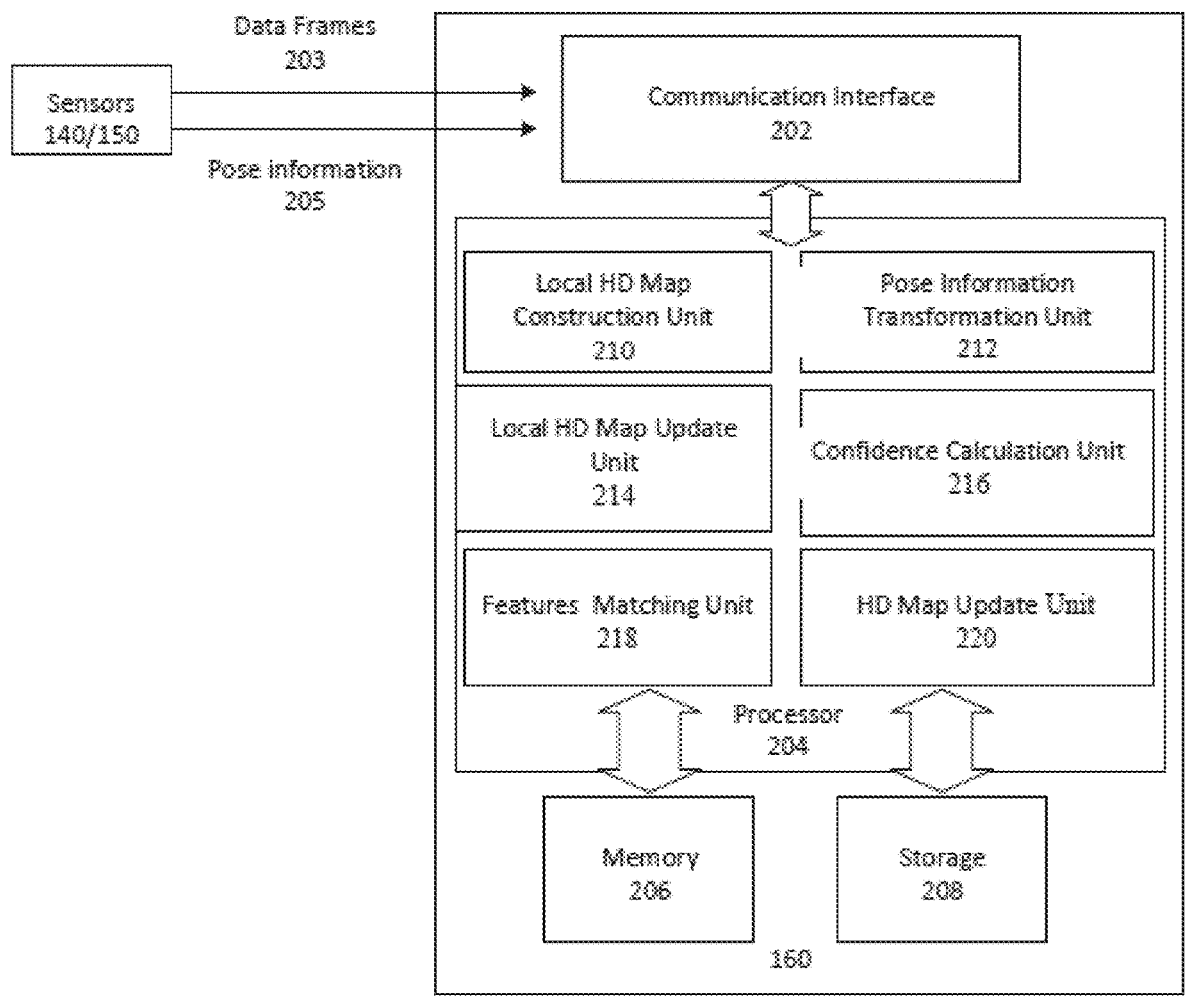
FIG. 2 illustrates a block diagram of an exemplary system for updating a HD map, according to embodiments of the disclosure.

For example, FIG. 2 illustrates a block diagram of an exemplary server 160 for updating a HD map, according to embodiments of the disclosure. Consistent with the present disclosure, server 160 may receive data frames 203 from sensor 140 and pose information 205 from sensor 150. Based on the data frames, server 160 may generate a local HD map, which may be then used, along with the pose information, to update a HD map. In some embodiments, server 160 may determine if the local HD map should be further updated based on the current data frame. If a calculated parameter meets a predetermined criterion, e.g., an average covariance of the updated local HD map is higher than a predetermined threshold level which indicates that the pose or position error of the data frame is too high, the current local HD map should stop being updated based on the last data frame and a new local HD map should be started. Otherwise, if the average covariance of the updated local HD map is lower than the predetermined threshold level, the current HD map will continue to be updated based on the data frame. In some embodiments, server 160 may also determine if the HD map should be updated based on the updated local HD map. If another calculated parameter meets another pre-determined criterium, e.g., a matching level between the updated local HD map and other local HD maps is higher than another predetermined threshold level, server 160 may decide to update the HD map based on the updated local HD map. Otherwise, if the other calculated parameter is lower than the another threshold level, server 160 may decide to not to update the HD map based on the updated local HD map.

In some embodiments, server 160 may have different modules in a single device, such as an integrated circuit (IC) chip (implemented as an application-specific integrated circuit (ASIC) or a field-programmable gate array (FPGA)), or separate devices with dedicated functions. In some embodiments, one or more components of server 160 may be located in a cloud, or may be alternatively in a single location (such as inside vehicle 100 or a mobile device) or distributed locations. Components of server 160 may be in an integrated device, or distributed at different locations but communicate with each other through a network (not shown).

In some embodiments, as shown in FIG. 2, server 160 may include a communication interface 202, a processor 204, a memory 206, and a storage 208. Communication interface 202 may send data to and receive data from components such as sensors 140 and 150 via communication cables, a Wireless Local Area Network (WLAN), a Wide Area Network (WAN), wireless networks such as radio waves, a cellular network, and/or a local or short-range wireless network (e.g., Bluetooth™), or other communication methods. In some embodiments, communication interface 202 can be an integrated services digital network (ISDN) card, cable modem, satellite modem, or a modem to provide a data communication connection. As another example, communication interface 202 can be a local area network (LAN) card to provide a data communication connection to a compatible LAN. Wireless links can also be implemented by communication interface 202. In such an implementation, communication interface 202 can send and receive electrical, electromagnetic or optical signals that carry digital data streams representing various types of information via a network.

Consistent with some embodiments, communication interface 202 may receive data such as data frame 203 captured by sensor 140, as well as pose information 205 captured by sensor 150. Communication interface may further provide the received data to storage 208 for storage or to processor 204 for processing. Communication interface 202 may also receive data generated by processor 204 and provide the data to any local component in vehicle 100 or any remote device via a network.

Processor 204 may include any appropriate type of general-purpose or special-purpose microprocessor, digital signal processor, or microcontroller. Processor 204 may be configured as a separate processor module dedicated to updating the HD map. Alternatively, processor 204 may be configured as a shared processor module for performing other functions unrelated to HD map update.

As shown in FIG. 2, processor 204 may include multiple modules, such as a local HD map construction unit 210, a pose information transformation unit 212, a local HD map update unit 214, a confidence calculation unit 216, a features matching unit 218 and a HD map update unit 220, and the like. These modules (and any corresponding sub-modules or sub-units) can be hardware units (e.g., portions of an integrated circuit) of processor 204 designed for use with other components or software units implemented by processor 204 through executing at least part of a program. The program may be stored on a computer-readable medium, and when executed by processor 204, it may perform one or more functions. Although FIG. 2 shows units 210-220 all within one processor 204, it is contemplated that these units may be distributed among multiple processors located near or remotely with each other. For example, modules related to constructing or updating local HD maps, such as local HD map construction unit 210, pose information transformation unit 212, local HD map update unit 21, and confidence calculation unit 216, etc. may be within a processor on vehicle 100. Modules related to constructing or updating the global HD map, such as features matching unit 218 and HD map update unit 220 may be within a processor on a remote server.

Local HD map construction unit 210 may be configured to construct local HD map based on data frames 203. In some embodiments, data frames 203 may be point cloud data frames. Local HD map construction unit 210 may be construed to construct a local HD map based on a first point cloud data frame acquired by sensor 140. For example, the local HD map may be constructed by adopting the coordinate of the first point cloud data frame.

Based on the constructed local HD map, pose information transformation unit 212 may be configured to transform a second point cloud data frame's pose information into the local coordinate of the local HD map. In some embodiments, the pose information of the second point cloud data frame may be determined by data acquired by sensor 150, such as a GPS receiver and one or more IMU sensors. For example, the pose information of the second point cloud data frame may be determined by associating the second point cloud data frame with the data acquired by sensor 150, at a same time point the second point cloud data frame is acquired. Pose information transformation unit 212 may be further configured to determine the relative pose information based on the pose information associated with the second data frame. In some embodiments, based on the relative pose information of the second data frame, pose information transformation unit 212 may transform the pose information of the second point cloud data frame into the local coordinate of the local HD map.

Based on the transformed pose information of the second point cloud data frame, local HD map update unit 214 may be configured to update the local HD map based on the second point cloud data frame. For example, local HD map update unit 214 may update the local HD map by mapping the second point cloud frame to the local HD map based on a rigid transformation of the transformed pose information of the second point cloud frame.

Based on the updated local HD map, confidence calculation unit 216 may be configured to calculate a confidence level of the updated local HD map. In some embodiments, the confidence level may be determined as an average covariance associated with the updated local HD map. In some embodiments, confidence calculation unit 216 may further be configured to determine if the confidence level of the updated local HD map is lower than a predetermined threshold level. If the confidence level of the updated local HD map is lower than a predetermined threshold level, processor 204 may initiate a request to continue capturing the next data frame (e.g., a third data frame) of the target region using LiDAR and updating the same local HD map.

If the confidence level of the updated local HD map is higher than the predetermined threshold level, the last update of the updated local HD map may be canceled (e.g., use the local HD map before the update as the undated local HD map) and processor 204 may update the HD map based on the updated local HD map. In some embodiments, a new local HD map construction is started. For example, processor 204 may initiate a survey request to vehicle equipped with LiDAR to survey another target region.

In some embodiments, feature matching unit 218 may extract/determine features within the updated local HD map. In some embodiments, the features may be extracted from road marks or standing objects, such as a lane division line, pedestrian walking marks (e.g., zebra lines), a traffic sign or a fence. For example, the features of the updated local HD map may include shape, size, texture, color, etc. data of the objects in the target region. In some embodiments, feature matching unit 218 may further extract/determine features of one or more pre-existing HD map that has been stored in storage 208.

In addition, feature matching unit 218 may match the features of the updated local HD map with the features of the one or more pre-existing HD maps. Feature matching unit 218 may calculate a matching level indicating the similarity between the features of the updated local HD map and those of the pre-existing HD maps. If the calculated matching level of the updated local HD map is lower than a predetermined threshold level, processor 204 may initiate a request to continue capturing the next data frame (e.g., a third data frame) of the target region using LiDAR and updating the same local HD map. If the matching level of the updated local HD map is higher than the predetermined threshold level, processor 204 may update the HD map based on the updated local HD map. In some embodiments, a new local HD map construction is started. For example, processor 204 may initiate a survey request to vehicle equipped with LiDAR to survey another target region.

In some embodiments, processor 204 may additionally include a sensor calibration unit (not shown) configured to determine one or more calibration parameters associated with sensor 140 or 150. In some embodiments, the sensor calibration unit may instead be inside vehicle 100, in a mobile device, or otherwise located remotely from processor 204. For example, sensor calibration may be used to calibrate a LiDAR scanner and the positioning sensor(s).

Memory 206 and storage 208 may include any appropriate type of mass storage provided to store any type of information that processor 204 may need to operate. Memory 206 and storage 208 may be a volatile or non-volatile, magnetic, semiconductor, tape, optical, removable, non-removable, or other type of storage device or tangible (i.e., non-transitory) computer-readable medium including, but not limited to, a ROM, a flash memory, a dynamic RAM, and a static RAM. Memory 206 and/or storage 208 may be configured to store one or more computer programs that may be executed by processor 204 to perform color point cloud generation functions disclosed herein. For example, memory 206 and/or storage 208 may be configured to store program (s) that may be executed by processor 204 to update a HD map based on data frames captured by sensor 140 or 150.

Memory 206 and/or storage 208 may be further configured to store information and data used by processor 204. For instance, memory 206 and/or storage 208 may be configured to store the various types of data (e.g., image frames, pose information, etc.) captured by sensors 140 and 150 and the HD map. Memory 206 and/or storage 208 may also store intermediate data such as machine learning models, features extracted from point clouds, calculated confidences, and local HD maps, etc. The various types of data may be stored permanently, removed periodically, or disregarded immediately after each frame of data is processed.

Figure 3:
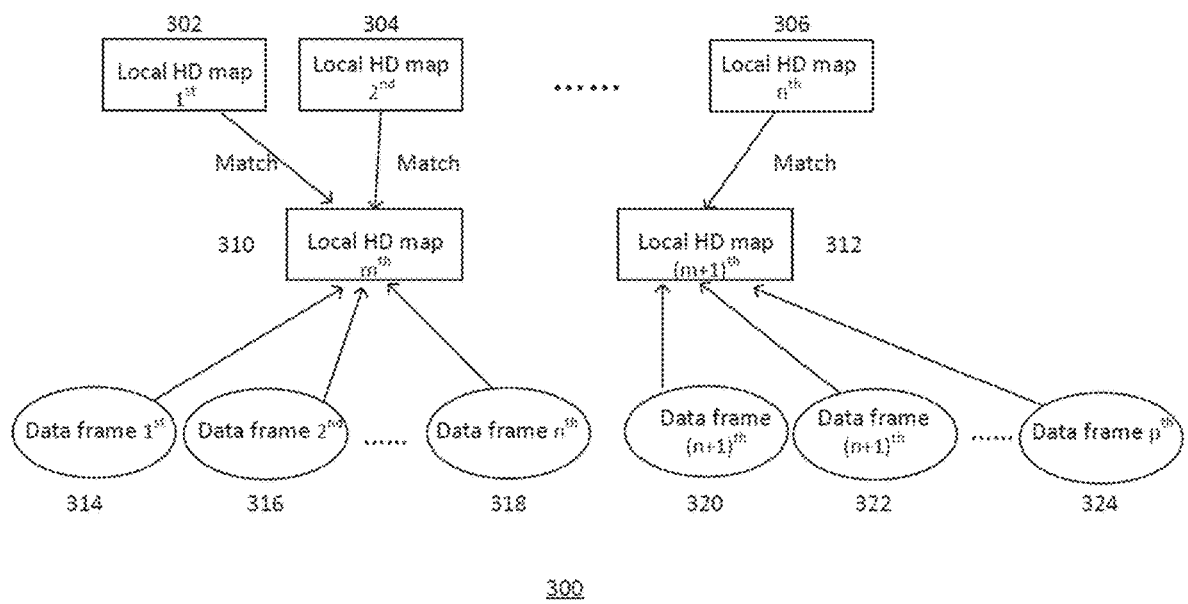
FIG. 3. illustrates an exemplary method for updating a HD map, according to embodiments of the disclosure.

FIG. 3 illustrates an exemplary method for updating a HD map, according to embodiments of the disclosure. Consistent with some embodiments, according to method 300, the $1^{st}$ data frame 314 may be used to construct local the $m^{th}$ HD map 310. Each of the data frames from the $2^{nd}$ data frame 316 to the $n^{th}$ data frame 318 may be used to update the $m^{th}$ local HD map 310 in a sequential order based on the time point each data frame is acquired. The updated $m^{th}$ local HD map may be matched with one or more preexisting local HD map, for example, the updated local HD map m may be matched with the preexisting $1^{st}$ local map 302 and/or the preexisting $2^{nd}$ local map 304. The similarity between the matched local HD maps may be then determined. If the similarity is higher than a predetermined threshold level (for example, enough matching features between the updated local HD map m and the one or more preexisting HD map, and/or the matching level of the features is high enough), store the updated $m^{th}$ local HD map. In some embodiments, processor 204 may then start constructing a new local HD map (e.g., the $(n+1)^{th}$ local HD map 312) using the next available data frame (e.g., the $(n+1)^{th}$ data frame 320). Each of the data frames from the $(n+2)^{th}$ data frame 322 to the $p^{th}$ data frame 324 may be used to update the $(m+1)^{th}$ local HD map. The updated $(m+1)^{th}$ local HD map may be matched with the preexisting $n^{th}$ local HD map to determine the matching level. The method for constructing, updating and matching of the $(m+1)^{th}$ local HD 312 may be the same or substantially the same with the method for constructing, update and matching of local HD map m 310.

Figure 4:
FIG. 4 illustrates an exemplary point cloud frame before and after trajectory interpolation, according to embodiments of the disclosure.
Figure 4:

FIG. 4 illustrates an exemplary point cloud frame before and after trajectory interpolation, according to embodiments of the disclosure. Point cloud 410 is a point cloud frame prior to trajectory interpolation with jagged dislocation. In contrast, point cloud 420 is the point cloud frame after trajectory interpolation processed by local HD map construction unit 210. The smoothness of the point cloud frame is improved due to the addition of data points using trajectory interpolation.

Figure 5:
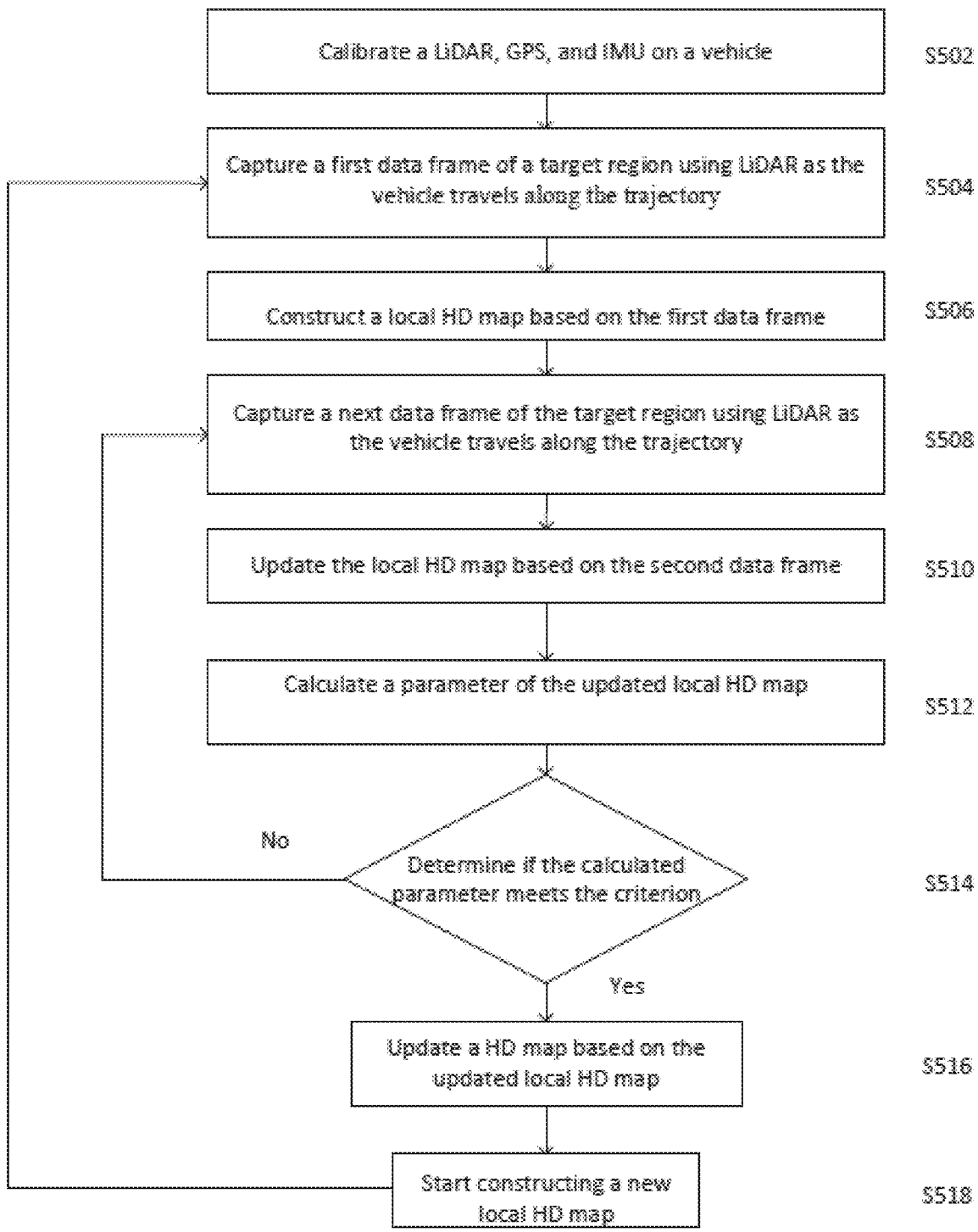
FIG. 5 illustrates a flowchart of an exemplary method for updating a HD map, according to embodiments of the disclosure.

FIG. 5 illustrates a flowchart of an exemplary method 500 for updating a HD map, according to embodiments of the disclosure. In some embodiments, method 500 may be implemented by a HD map update system that includes, among other things, server 160 and sensors 140 and 150. However, method 500 is not limited to that exemplary embodiment. Method 500 may include steps S502-S518 as described below. It is to be appreciated that some of the steps may be optional to perform the disclosure provided herein. Further, some of the steps may be performed simultaneously, or in a different order than shown in FIG. 5.

In step S502, one or more of sensors 140 and 150 may be calibrated. In some embodiments, vehicle 100 may be dispatched for a calibration trip to collect data used for calibrating sensor parameters. Calibration may occur before the actual survey is performed for constructing and/or updating the map. Point cloud data captured by a LiDAR (as an example of sensor 140) and pose information acquired by positioning devices such as a GPS receiver and one or more IMU sensors may be calibrated.

In step S504, sensor 140 may capture a first data frame of a target region as vehicle 100 travels along a trajectory. In some embodiments, as vehicle 100 moves along the trajectory, sensor 140 may capture the first data frame of the target region. In some embodiments, the first data frame of the target region may be a point cloud data frame. Vehicle 100 may be equipped with sensor 140, such as a LiDAR laser scanner. As vehicle 100 travels along the trajectory, sensor 140 may continuously capture frames of scene data at different time points in the form of a frame of point cloud data in a local coordinate system. Vehicle 100 may be also equipped with sensor 150, such as a GPS receiver and one or more IMU sensors. Sensors 140 and 150 may form an integrated sensing system. In some embodiments, when vehicle 100 travels along the trajectory in the natural scene and when sensor 140 captures the set of point cloud data indicative of the target region, sensor 150 may acquire real-time pose information of vehicle 100.

In some embodiments, the captured data frame, including e.g., point cloud frames and pose information, may be transmitted from sensors 140/150 to server 160 in real-time. For example, the data may be streamed as they become available. Real-time transmission of data enables server 160 to process the data frame by frame in real-time while subsequent frames are being captured. Alternatively, data may be transmitted in bulk after a section of, or the entire survey is completed.

In step S506, processor 204 may construct a local HD map based on the first data frame of the target region and the pose information associated with the first data frame. In some embodiments, the local HD map may be construct based on the coordinate of the first data frame. For example, processor 204 may generate the local coordinate of the local HD map based on vehicle 100's global coordinate system pose information at the time the first data frame was acquired.

In step S508, sensor 140 may capture a second data frame of the target region as vehicle 100 travels along the trajectory. In some embodiments, as vehicle 100 moves along the trajectory, sensor 140 may capture the second data frame of the target region. Typically, a set time interval is used between every two time points. For example, the second data frame may be captured 1 ms, 2 ms, or the like after the first data frame is captured. Vehicle 100 is at a different pose corresponding to each time point when a different data frame is captured. Accordingly, each data frame can be associated with a vehicle pose. In some embodiments, the second data frame of a target region may also be a point cloud data frame.

In step S510, processor 204 may update the local HD map based on the second data frame. In some embodiments, processor 204 may map the second data frame to the local HD map. For example, the processor 204 may use a rigid transformation method (rotation and translation transformation) to transform the pose information of the second data frame to the local coordinate of the local HD map. Then the processor 204 may incorporate the second data frame to the local HD map based on the transformation.

In step S512, processor 204 may calculate a parameter of the updated local HD map. In some embodiments, the calculated parameter is a matching level between the updated local HD map and a pre-existing local HD map. For example, the features of the updated local HD map may include shape, size, color, textures, etc. of the objects in the targeted region. In some embodiments, processor 204 may further extract/determine features of one or more pre-existing HD maps that have been stored in storage 208. In addition, processor 204 may match the features of the updated local HD map with the features of the one or more pre-existing HD maps and calculate a matching level between the updated local HD map and a pre-existing local HD map.

In some embodiments, in step S514, it is determined whether the calculated parameter meets predetermined criterion. For example, if the calculated parameter is the matching level described above, it may be compared with a threshold value corresponding to a sufficient level of matching. If the matching level is higher than the threshold value (S514: yes), method 500 proceeds to step S516. Otherwise (S514: no), method 500 returns to S508 to continue capturing the next data frame (e.g., a third data frame) of the target region using LiDAR, and updating the same local HD map in S510.

In some other embodiments, the calculated parameter in step S512 is a confidence level of the updated local HD map. For example, the confidence level may be determined as an average covariance associated with the updated local HD map. In some embodiments, the average covariance associated with an updated local HD map that includes a number of point cloud data frames may be calculated by Eq 1:

$$\Omega_x^{odom} = \frac{1}{\sum_i w_i} \cdot \sum_i w_i \cdot T_{i,0}^F \cdot \Omega_{F_i}^{odom} \cdot T_{i,0}^{F^T} \quad \text{Eq 1}$$

Where $\Omega_x^{odom}$ is the average covariance associated with the local HD map, $w_i$ is the number of points in the $i^{th}$ point cloud data frame, $\Omega_{F_i}^{odom}$ is the covariance of the $i^{th}$ point cloud data frame, and $T_i^F$ is the covariance of the $i^{th}$ point cloud data frame and the first point cloud frame. In some embodiments, the covariance may be calculated based on pose of a point cloud frame.

In step S514, if the calculated parameter is the confidence level (e.g., an average covariance) of the local HD map, it may be compared with a threshold value corresponding to a sufficiently high accumulated error. If the confidence level is higher than the threshold value (S514: yes), cancel the last update (e.g. use the local HD map before the update as the updated local HD map) and method 500 proceeds to step S516. Otherwise (S514: no), method 500 returns to S508 to continue capturing the next data frame (e.g., a third data frame) of the target region using LiDAR and updating the same local HD map in S510.

In step S516, processor 204 may update the HD map based on the updated local HD map. In some embodiments, processor 204 may use the updated local HD map as constrains in HD map update. For example, the updating step may include the constraint (1)

$$(x_t + \delta_{st} x_s)^T L_s (x_t + \delta_{st} - x_s) \quad (1)$$

Where $\delta_{st}$ is the shift between the poses $x_s$ and $x_t$, and $L_{st}$ is the strength of this constraint (an inverse covariance).

In step S518, processor 204 may start constructing a new local HD map. For example, processor 204 may initiate a survey request to the vehicle 100 to acquire another first data frame of another target region (e.g. a second target region) using sensor 140 and sensor 150 as vehicle 100 travels along another trajectory (e.g. a second trajectory). In some embodiment, the survey request to the vehicle 100 may be sent via the communication interface 202.

Another aspect of the disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A method for updating a HD map, comprising:
   receiving, by a communication interface, a first data frame of a target region acquired by at least one sensor equipped on a survey vehicle dispatched to survey the target region in order to update the HD map;
   constructing, by at least one processor, a local HD map based on the first data frame;
   receiving, by the communication interface, a second data frame of the target region acquired by the at least one sensor;
   updating, by the at least one processor, the local HD map using the second data frame based on relative location and pose information associated with the second data frame relative to the local HD map; and
   updating the HD map based on the updated local HD map.

2. The method of claim 1, wherein the at least one sensor comprises a LiDAR, and the first data frame and the second data frame are point cloud data frames.

3. The method of claim 1, further comprising:
   determining pose information associated with the second data frame based on data acquired by an IMU sensor at a same time point the second data frame is acquired; and
   determining the relative pose information based on the pose information associated with the second data frame.

4. The method of claim 3, further comprising transforming the second data frame into a local coordinate of the local HD map based on the pose information associated with the second data frame.

5. The method of claim 1, wherein updating the HD map further comprises determining that a calculated parameter of the updated local HD map is higher than a threshold level.

6. The method of claim 5, further comprising:
   receiving, by the communication interface, a third data frame acquired by the at least one sensor; and
   constructing a new local HD map using the third data frame independent from the local HD map.

7. The method of claim 5, wherein the calculated parameter is a confidence level of the updated local HD map.

8. The method of claim 7, wherein the confidence level is determined as a covariance associated with the updated local HD map.

9. The method of claim 5, wherein the calculated parameter is a matching level between the updated local HD map and at least one pre-existing local HD map that is above the threshold level.

10. The method of claim 9, further comprising:
    determining a first set of features of the updated local HD map;
    determining a second set of features of the at least one pre-existing local HD map; and
    determining the matching level between the updated local HD map and the at least one pre-existing local HD map by determining a matching level between the first set of features and the second set of features.

11. The method of claim 1, wherein the updated local HD map is used as a constraint for updating the HD map.

12. A system for updating a HD map, comprising:
    a communication interface configured to receive a first data frame of a target region and a second data frame of the target region acquired by at least one sensor via network, wherein the at least one sensor is equipped on a survey vehicle dispatched to survey the target region in order to update the HD map;
    a storage configured to store the HD map; and
    at least one processor, configured to:
        construct a local HD map based on the first data frame;
        update the local HD map using the second data frame based on relative location and pose information associated with the second data frame relative to the local HD map; and
        update the HD map based on the updated local map.

13. The system of claim 12, wherein the at least one sensor comprises a LiDAR, and the first data frame and the second data frame are point cloud data frames.

14. The system of claim 12, wherein to update the local HD map using the second data frame, the at least one processor is further configured to:
    determine pose information associated with the second data frame based on data acquired by an IMU sensor at a same time point the second data frame is acquired; and
    determine the relative pose information based on the pose information associated with the second data frame.

15. The system of claim 14, wherein the at least one processor is further configured to transform the second data frame into a local coordinate of the local HD map based on the pose information associated with the second data frame.

16. The system of claim 14, wherein the at least one processor is further configured to determine that a calculated parameter of the updated local HD map is higher than a threshold level.

17. The system of claim 16, wherein the calculated parameter is a confidence level of the updated local HD map.

18. The system of claim 17, wherein the confidence level is determined as a covariance associated with the updated local HD map.

19. The system of claim 16, wherein the at least one processor is further configured to:
    determine a first set of features of the updated local HD map;
    determine a second set of features of a at least one pre-existing local HD map; and
    determine a matching level between the first set of features and the second set of features.

20. A non-transitory computer-readable medium having a computer program stored thereon, wherein the computer program, when executed by at least one processor, performs a method for updating a HD map, the method comprising:
    receiving a first data frame of a target region acquired by at least one sensor equipped on a survey vehicle dispatched to survey the target region in order to update the HD map;
    constructing a local HD map based on the first data frame;
    receiving a second data frame of the target region acquired by the at least one sensor;

updating the local HD map using the second data frame based on relative location and pose information associated with the second data frame relative to the local HD map; and updating the HD map based on the updated local HD map.

* * * * *